United States Patent
Hata et al.

(10) Patent No.: US 6,891,589 B2
(45) Date of Patent: May 10, 2005

(54) OPTICAL FILM, ELLIPTICALLY POLARIZING PLATE AND IMAGE DISPLAY

(75) Inventors: Masahiro Hata, Ibaraki (JP); Hiroyuki Okada, Ibaraki (JP); Kiichi Shimodaira, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 0 days.

(21) Appl. No.: 10/733,445

(22) Filed: Dec. 12, 2003

(65) Prior Publication Data

US 2004/0119922 A1 Jun. 24, 2004

(30) Foreign Application Priority Data

Dec. 16, 2002 (JP) .......................... 2002-363696
Jan. 18, 2003 (JP) .......................... 2003-001791

(51) Int. Cl.[7] .................................................. G02F 1/13
(52) U.S. Cl. ........................ 349/117; 349/118; 349/119
(58) Field of Search ................................ 349/117–121

(56) References Cited

U.S. PATENT DOCUMENTS

| | | | | |
|---|---|---|---|---|
| 5,406,396 A | * | 4/1995 | Akatsuka et al. | 349/118 |
| 5,587,821 A | * | 12/1996 | Nakanishi et al. | 349/118 |
| 5,825,445 A | * | 10/1998 | Okamoto et al. | 349/118 |
| 5,859,681 A | * | 1/1999 | VanderPloeg et al. | 349/120 |
| 5,895,106 A | * | 4/1999 | VanderPloeg et al. | 349/120 |
| 5,923,392 A | * | 7/1999 | Akatsuka et al. | 349/118 |
| 5,986,732 A | * | 11/1999 | Ozeki et al. | 349/118 |
| 6,292,242 B1 | * | 9/2001 | VanderPloeg et al. | 349/118 |
| 6,330,108 B1 | | 12/2001 | Nishikouji et al. | 359/499 |
| 6,433,853 B1 | * | 8/2002 | Kameyama et al. | 349/176 |
| 6,480,251 B1 | * | 11/2002 | Yamaguchi et al. | 349/119 |
| 6,667,835 B2 | * | 12/2003 | Yano et al. | 359/499 |
| 6,762,811 B2 | * | 7/2004 | Sasaki et al. | 349/118 |
| 6,771,340 B1 | * | 8/2004 | Yoshimi et al. | 349/118 |

FOREIGN PATENT DOCUMENTS

| | | |
|---|---|---|
| EP | 0 482 620 | 4/1992 |
| EP | 0 962 805 | 12/1999 |
| EP | 1 069 461 | 1/2001 |
| EP | 1 087 254 | 3/2001 |
| JP | 5-100114 | 4/1993 |
| JP | 10-68816 | 3/1998 |
| JP | 10-90521 | 4/1998 |

* cited by examiner

Primary Examiner—James A. Dudek
(74) Attorney, Agent, or Firm—Westerman, Hattori Daniels & Adrian LLP (57) ABSTRACT

A laminated optical film including an optical film (1) whose three dimensional refractive index is controlled so that an Nz coefficient represented with $Nz=(nx_1-nz_1)/(nx_1-ny_1)$ satisfies a relationship of $Nz \leq 0.9$, when a direction where a refractive index in a film plane gives maximum is defined as X-axis, a direction perpendicular to X-axis as Y-axis, a thickness direction of the film as Z-axis, and refractive indexes in each axial direction are defined as $nx_1$, $ny_1$, and $nz_1$, respectively, and an optical film (2) that is formed with a material showing optically negative uniaxial property, and being tilting aligned.

The laminated optical film may suppress coloring of the display, and may display a picture with few tone reversal regions.

20 Claims, 2 Drawing Sheets

OPTICAL FILM, ELLIPTICALLY POLARIZING PLATE AND IMAGE DISPLAY

BACKGROUND OF THE INVENTION

Field of the Invention

The present invention relates to a laminated optical film. A laminated optical film of this invention may be used as various optical films such as a retardation plate, a viewing angle compensating film, an optical compensating film, an elliptically polarizing plate (including a circularly polarizing plate), and a brightness enhancement film, independently or in combination with other optical films. Especially in the case where it is used as an elliptically polarizing plate laminated with a polarizing plate, a laminated optical film of this invention is useful. Moreover, this invention relates to an image display, such as a liquid crystal display, an organic EL (electroluminescence) display, a PDP, etc. using the laminated optical film, and elliptically polarizing plate, etc. The laminated optical film and the elliptically polarizing plate of this invention may be used to various liquid crystal displays etc. as mentioned above, and may be utilized particularly suitably for a reflective semi-transmission type liquid crystal display that can be mounted in portable information and telecommunications instruments, and personal computer, etc.

Prior Art

Conventionally, a broadband retardation plate that functions as a quarter wavelength plate or a half wavelength plate to incident light (in visible light region) having a wavelength in broadband has been suitably used in reflective semi-transmission type liquid crystal displays etc. As such broadband retardation plates, a laminated film is proposed in which a plurality of polymer films having optical anisotropy are laminated with optical axes being made to mutually intersect. Broadband is realized in these laminated films by intersection of optical axes of two sheets or a plurality of sheets of stretched films. For example, refer to Japanese Patent Laid-Open No.5-100114 official gazette, Japanese Patent Laid-Open No.10-68816 official gazette, and Japanese Patent Laid-Open No.10-90521 official gazette.

However, there have been defects that observation of an display in vertically and horizontally diagonal directions with respect to a direction of normal line of a screen causes tone reversal that gives a varied hue of the display or a reversal between white pictures and black pictures, even when a broadband retardation plate having a constitution disclosed in the above-mentioned Referential Patents is used.

SUMMARY OF THE INVENTION

The present invention aims at providing an optical film in which observation of a display in a diagonal direction with respect to a direction of a normal line of a picture may suppress coloring of the display, and, as a result, may display a picture with few tone reversal regions.

Besides, the present invention aims at providing an elliptically polarizing plate in which the above-mentioned optical film and polarizing plate are laminated. Furthermore, this invention aims at providing an image display using the above-mentioned optical film or the elliptically polarizing plate.

Wholehearted research performed by the present inventors in order to solve the above-mentioned subject revealed that use of following laminated optical films might attain the above-described object, and resulted in completion of the present invention.

That is, the present invention relates to a laminated optical film comprising an optical film (1) whose three dimensional refractive index is controlled so that an Nz coefficient represented with $Nz=(nx_1-nz_1)/(nx_1-ny_1)$ satisfies a relationship of $Nz \leq 0.9$, when a direction where a refractive index in a film plane gives maximum is defined as X-axis, a direction perpendicular to X-axis as Y-axis, a thickness direction of the film as Z-axis, refractive indexes in each axial direction are defined as $nx_1$, $ny_1$, and $nz_1$, respectively, and an optical film (2) that is formed with a material showing optically negative uniaxial property, and being tilting aligned.

In a laminated optical film of the present invention described above, an optical film (1) having a controlled three dimensional refractive index, and an optical film (2) in which a material showing optically negative uniaxial property is tilting aligned are laminated, which is useful as a retardation plate having compensating property over a broadband and wide viewing angle. Image displays such as liquid crystal displays using the laminated optical film concerned may realize a wide viewing angle, and moreover, observation in diagonal directions with respect to a display screen suppresses display coloring, and therefore may display a picture having few tone reversal regions.

In the optical film (1) whose three dimensional refractive index is controlled, an Nz coefficient defined by the above-mentioned description is $Nz \leq 0.9$. The Nz coefficient of $Nz > 0.9$ may not easily realize a wide viewing angle, and may not sufficiently suppress display coloring in case of observation in diagonal directions of a display screen, but provides reversal of contrast, that is, tone reversal in diagonal directions. The smaller Nz coefficient the better, and preferably it satisfies $Nz \leq 0.3$, and more preferably $Nz \leq 0.2$. In addition, in the optical film (1), a case of $(nx_1-nz_1)<0$ may be included and the Nz coefficient may have negative values. However, in view of a viewing angle expansion in vertical and horizontal direction, the Nz coefficient is preferably controlled −1 or more, and more preferably −0.5 or more.

In the above-mentioned laminated optical film, the material showing optically negative uniaxial property forming the optical film (2), it is preferably of a discotic liquid crystal compound. Although a material showing optically negative uniaxial property is not especially limited, but a discotic liquid crystal compound is preferable in view of realization of effective control of tilted alignment, commonly available material, and comparatively low cost.

In the above-mentioned laminated optical film, the material showing optically negative uniaxial property forming the optical film (2) is preferably tilting aligned so that an average optical axis, and a direction of normal line of the optical film (2) may give a tilting angle in a range of 5 degrees to 50 degrees.

The optical film (2) is combined with the optical film (1) having a controlled three-dimensional refractive index to be used as the laminated optical film as mentioned above. And when it is mounted in liquid crystal displays etc., it may demonstrate a large viewing angle expansion effect by controlling the above-mentioned tilting angle of the optical film (2) to be at 5 degrees or more. On the other hand, excellent viewing angle is realized in any directions in vertical and horizontal directions (four directions) by controlling the above-mentioned tilting angle at 50 degrees or less, and therefore a phenomenon may be suppressed in which quality of a viewing angle is variable dependent on directions. In the viewpoint of the above-mentioned reason, the tilting angle is preferably in a range of 10 degrees to 30 degrees.

Besides, a state of tilted alignment of optical material (for example, discotic liquid crystalline molecule) showing optically negative uniaxial property may be a uniform tilted alignment that does not vary in connection with a distance from an inside of a film plane, and may vary in connection with a distance between the above-mentioned optical material and inside of the film plane.

Furthermore, the present invention relates to a laminated optical film comprising: the above-mentioned laminated optical film and an optical film (3) that satisfies $nx_3 > ny_3 \approx nz_3$ and demonstrates optically positive uniaxial property when a direction where a refractive index in a film plane gives maximum is defined as X-axis, a direction perpendicular to X-axis as Y-axis, a thickness direction of the film as Z-axis, and refractive indexes in each axial direction are defined as $nx_3$, $ny_3$, and $nz_3$, respectively.

The optical film (3) showing optically positive uniaxial property is further laminated to the laminated optical film in which the optical film (1) having a controlled three dimensional refractive index and the optical film (2) in which a material showing optically negative uniaxial property is tilting aligned are laminated. And thereby image displays such as liquid crystal displays, using the laminated optical film concerned, may realize a more wide viewing angle, suppress display coloring in case of observation in diagonal directions with respect go a display screen, and moreover may display pictures having few tone reversal regions.

In the above-mentioned laminated optical film in which the optical film (3) is laminated, a constitution, in which the optical film (1) having the controlled three dimensional refractive index is arranged between the optical film (3) showing optically positive uniaxial property, and the optical film (2) in which the material showing optically negative uniaxial property is tilting aligned, may realize a wide viewing angle, which is preferable in order to control more effectively a tone reversal region in case of observation in diagonal directions.

Moreover, the present invention relates to an elliptically polarizing plate in which the above-mentioned laminated optical film and a polarizing plate are laminated. The above-mentioned elliptically polarizing plate is a laminated optical film in which the optical film (3) is laminated, a constitution in which a polarizing plate is laminated on a side of the optical film (3) is preferable in view of tone reversal region in case of observation in diagonal directions.

Furthermore, the present invention relates to an image display in which the above-mentioned laminated optical film or elliptically polarizing plate is laminated.

DESCRIPTION OF THE PREFERRED EMBODIMENTS

Figure 1:
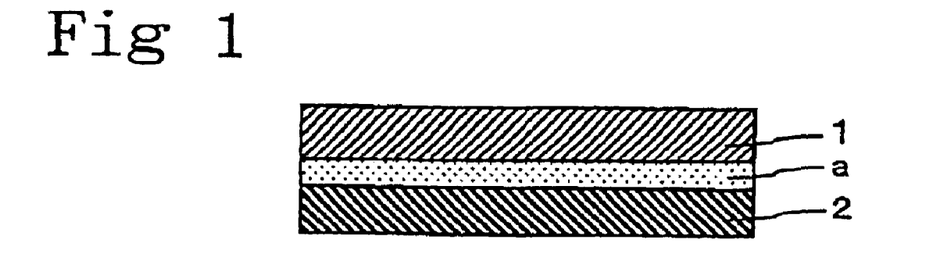
FIG. 1 shows one embodiment of a sectional view of a laminated optical film of the present invention.
Figure 2:
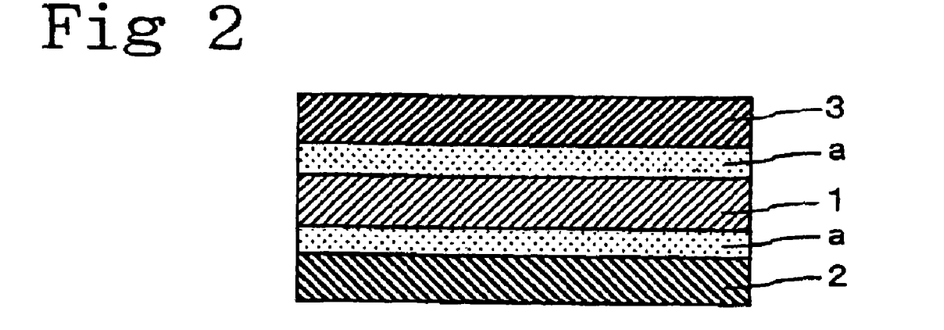
FIG. 2 shows one embodiment of a sectional view of a laminated optical film of the present invention.
Figure 3:
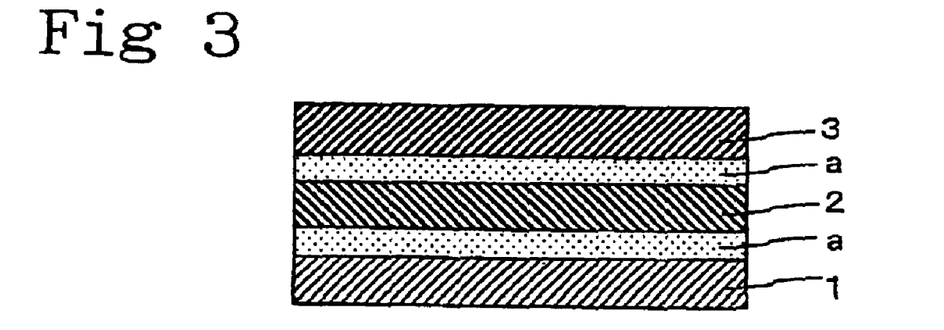
FIG. 3 shows one embodiment of a sectional view of a laminated optical film of the present invention.
Figure 4:
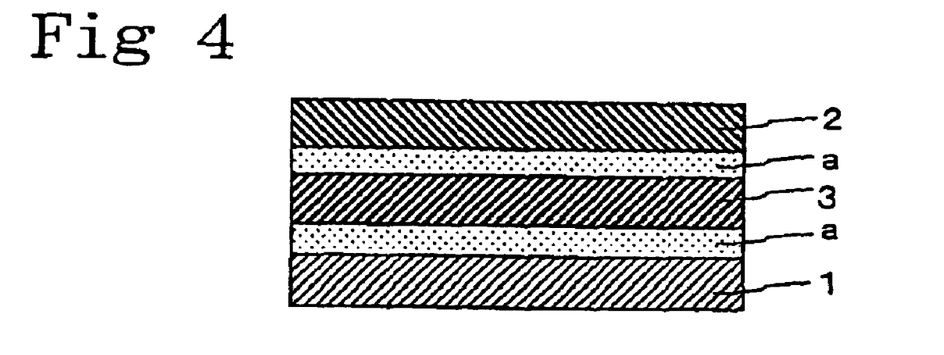
FIG. 4 shows one embodiment of a sectional view of a laminated optical film of the present invention.

A laminated optical film of the present invention, hereinafter, is described referring to drawings. As shown in FIG. 1, in a laminated optical film of the present invention, an optical film (1) having a controlled three dimensional refractive index, and an optical film (2) in which a material showing optically negative uniaxial property is tilting aligned are laminated. FIG. 2 or 4 show a laminated optical film in which an optical film (3) showing optically positive uniaxial property is further laminated to the above-mentioned optical film. In FIG. 2, the optical film (3) is laminated on a side of the optical film (1), and in FIG. 3, the optical film (3) is laminated on a side of the optical film (2). In addition, in FIG. 4, the optical film (3) is laminated between the optical film (1) and the optical film (2). Lamination position of the optical film (3) may be on a side of the optical film (2) and/or on a side of the optical film (1), and, furthermore, may be any position between them. As FIG. 2 shows, the optical film (3) is preferably arranged on a side of the optical film (1), and the optical film (1) is laminated between the optical film (2) and the optical films (3).

Figure 5:
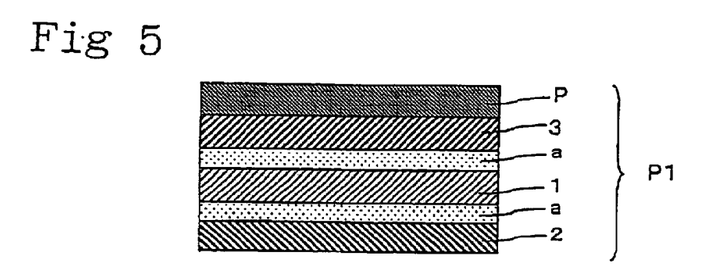
FIG. 5 shows one embodiment of a sectional view of an elliptically polarizing plate of the present invention.
Figure 6:
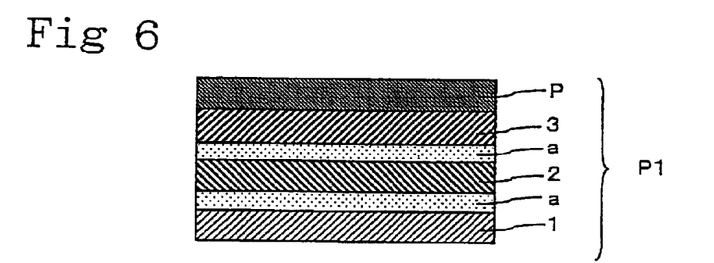
FIG. 6 shows one embodiment of a sectional view of an elliptically polarizing plate of the present invention.
Figure 7:
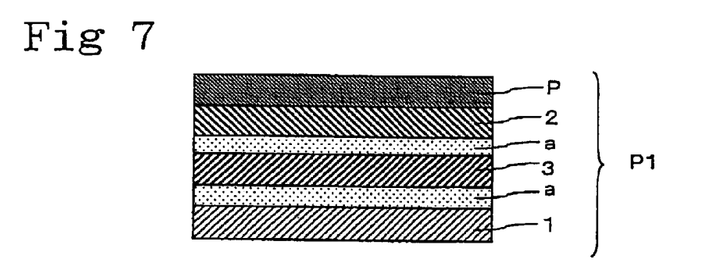
FIG. 7 shows one embodiment of a sectional view of an elliptically polarizing plate of the present invention.

Besides, a polarizing plate (P) may be laminated to the laminated optical film to obtain an elliptically polarizing plate. FIGS. 5 to 7 show an elliptically polarizing plate (P1) in which a polarizing plate (P) is laminated to the laminated optical film shown in FIGS. 2 to 4. In addition, a lamination position of the polarizing plate (P) with respect to the laminated optical film is not especially limited, and since it extends a viewing angle wider when mounted in liquid crystal display, the polarizing plate (P) is preferably laminated on a side of the optical film (3) as shown in FIGS. 5 to 6. Particularly a case of FIG. 5 is preferable.

Furthermore, in FIG. 1 to FIG. 7, each optical film and polarizing plate are laminated via pressure sensitive adhesive layers (a). The pressure sensitive adhesive layer (a) may be single-layered, and may be multi-layered with plurality of layers.

As an optical film (1) having a controlled three dimensional refractive index, any optical film may be used as long as an Nz coefficient thereof represented with $Nz=(nx_1-nz_1)/(nx_1-ny_1)$ satisfies a relationship of $Nz \leq 0.9$, when a direction where a refractive index in a film plane gives maximum is defined as X-axis, a direction perpendicular to X-axis as Y-axis, a thickness direction of the film as Z-axis, refractive indexes in each axial direction are defined as $nx_1$, $ny_1$, and $nz_1$, respectively.

Methods for manufacturing an optical film (1) is not especially limited, and there may be mentioned: for example, a method in which a polymer film is stretched biaxially in a direction of a plane, and a method in which a polymer film is uniaxially or biaxially stretched in a direction of a plane, and then is stretched also in a thickness direction. Furthermore, a method in which a thermal shrinkable film is adhered to a polymer film, and stretching processing and/or shrinking process are given to the polymer film under influence of shrinking force caused by heating may be mentioned. A refractive index in a thickness direction is controlled by these methods, and alignment state is controlled so that a three dimensional refractive index of the resulting stretched film may be $Nz \leq 0.9$.

As polymers for forming the optical film (1), for example, polycarbonates; polyolefins such as polypropylenes; polyesters such as polyethylene terephthalates and polyethylenenaphthalates; norbornene polymers; polyvinyl alcohols; polyvinyl butyrals; polymethyl vinyl ethers; polyhydroxyethyl acrylates; hydroxyethyl celluloses; hydroxy propylcelluloses; methylcelluloses; polyallylates; polysulfones; polyethersulfones; polyphenylene sulfides; polyphenylene oxides; polyallyl sulfones; polyamides; polyimides; polyvinyl chlorides; cellulose polymers such as triacetyl celluloses, etc.; acrylic polymers; styrene polymers or binary based or ternary based various copolymers, graft copolymers, blended materials thereof may be mentioned.

In the optical film (1), $Nz \leq 0.9$, but a front retardation thereof $((nx_1-ny_1) \times d_1$ (thickness: nm)) is preferably 10 to 400 nm, and more preferably 50 to 200 nm. A retardation in a thickness direction $((nx_1-nz_1) \times d_1)$ is preferably 10 to 400 nm, and more preferably 50 to 300 nm.

A thickness $(d_1)$ of the optical film (1) is not especially limited, but preferably it is 1 to 150 micrometers, and more preferably 5 to 50 micrometers.

The material showing optically negative uniaxial property forming the optical film (2) represents a material in which a refractive index of principal axis in one direction is smaller than refractive indexes in other two directions for an ellipsoid having three dimensional refractive index.

As materials showing optically negative uniaxial property, polyimide based materials, and liquid crystal based materials such as discotic liquid crystal compounds may be mentioned. Moreover, there may be mentioned materials in which these materials as a principal component are mixed and reacted with the other oligomers and polymers to obtain a fixed state in a film form of tilted alignment of the material showing negative uniaxial property. When discotic liquid crystal compounds are used, an tilted alignment state of liquid crystalline molecules may be controlled by a molecular structure, by a kind of alignment layer, and by use of additives (for example, plasticizers, binders, surface active agents) being added appropriately into an optical anisotropic layer.

A front retardation $((nx_2-ny_2) \times d_2$ (thickness: nm)) of the optical film (2) is preferably 0 to 200 nm, and more preferably 1 to 150 nm, when a direction where a refractive index in a film plane of the optical film (2) gives maximum is defined as X-axis, a direction perpendicular to X-axis as Y-axis, a thickness direction of the film as Z-axis, refractive indexes in each axial direction are defined as $nx_2$, $ny_2$, and $nz_2$, respectively. A retardation in a thickness direction $((nx_2-nz_2) \times d_2)$ is preferably 10 to 400 nm, and more preferably 50 to 300 nm.

A thickness $(d_2)$ of the optical film (2) is not especially limited, but it is preferably 1 to 200 micrometers, and more preferably 2 to 150 micrometers.

In conducting lamination for the optical film (1) and the optical film (2), the films are preferably laminated so that an each slow axis of the films may give an angle, which is smaller than other angle, in a range of 70 degrees to 90 degrees, more preferably in a range of 80 degrees to 90 degrees.

As optical films (3) showing optically positive uniaxial property, materials satisfying a relationship of $nx_3 > ny_3 \approx nz_3$ may be used without particular limitation, where a direction in which a refractive index in a film plane gives maximum is defined as X-axis, a direction perpendicular to X-axis as Y-axis, a thickness direction of the film as Z-axis, refractive indexes in each axial direction are defined as $nx_3$, $ny_3$, and $nz_3$, respectively. That is, a material showing optically positive uniaxial property represents a material in which a refractive index of principal axis in one direction is larger than refractive indexes in other two directions for an ellipsoid having three-dimensional refractive index.

The optical film (3) showing optically positive uniaxial property (3) may be obtained, for example, by giving a uniaxial stretching process in a planar direction to a polymer film illustrated in the optical film (1). Besides, rodlike nematic liquid crystalline compounds may also be used. Rodlike nematic liquid crystalline compounds may be tilting aligned, whose tilted alignment state may be controlled by a molecular structure, by a kind of alignment layer, and by use of additives (for example, plasticizers, binders, surface active agents) added appropriately into an optical anisotropic layer.

A front retardation $((nx_3-ny_3) \times d_3$ (thickness: nm)) of the optical film (3) is preferably 0 to 500 nm, and more preferably 1 to 350 nm. A retardation in a thickness direction $((nx_3-nz_3) \times d_3)$ is preferably 0 to 500 nm, and more preferably 1 to 350 nm.

A thickness $(d_3)$ of the optical film (3) is not especially limited, but preferably it is 1 to 200 micrometers, and more preferably 2 to 80 micrometers.

A polarizing plate (P) may be usually used a polarizer with a transparent protective film prepared on one side or both sides of the polarizer. The polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film on which dichromatic materials (iodine, dyes) is absorbed and oriented after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride.

Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

As the transparent protective film prepared on one side or both sides of the polarizer, materials is excellent in transparency, mechanical strength, heat stability, water shielding property, isotropy, etc. may be preferably used. As materials of the above-mentioned protective layer, for example, polyester type polymers, such as polyethylene terephthalate and polyethylenenaphthalate; cellulose type polymers, such as diacetyl cellulose and triacetyl cellulose; acrylics type polymer, such as polymethylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-etherketone type polymers; polyphenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. Films made of heat curing type or ultraviolet ray curing type resins, such as acryl based, urethane based, acryl urethane based, epoxy based, and silicone based, etc. may be mentioned.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

As a transparent protective film preferably used, in viewpoint of polarization property and durability, triacetyl cellulose film whose surface is saponificated with alkali is suitable. In general, a thickness of a transparent protective film is about 10 through 500 μm, preferably 20 through 300 μm, and especially preferably 30 through 200 μm.

Moreover, it is preferable that the transparent protective film may have as little coloring as possible. Accordingly, a protective film having a phase difference value in a film thickness direction represented by Rth=[(nx+ny)/2−nz]×d of −90 nm through +75 nm (where, nx and ny represent principal indices of refraction in a film plane, nz represents refractive index in a film thickness direction, and d represents a film thickness) may be preferably used. Thus, coloring (optical coloring) of polarizing plate resulting from a protective film may mostly be cancelled using a protective film having a phase difference value (Rth) of −90 nm through +75 nm in a thickness direction. The phase difference value (Rth) in a thickness direction is preferably −80 nm through +60 nm, and especially preferably −70 nm through +45 nm.

As a transparent protective film, if polarization property and durability are taken into consideration, cellulose based polymer, such as triacetyl cellulose, is preferable, and especially triacetyl cellulose film is suitable. In addition, when transparent protective films are provided on both sides of the polarizer, transparent protective films comprising same polymer material may be used on both of a front side and a back side, and transparent protective films comprising different polymer materials etc. may be used. Adhesives are used for adhesion processing of the above described polarizer and the transparent protective film. As adhesives, polyvinyl alcohol derived adhesives, gelatin derived adhesives, vinyl polymers derived latex type, aqueous polyurethane based adhesives, aqueous polyesters derived adhesives, etc. may be mentioned.

A hard coat layer may be prepared, or antireflection processing, processing aiming at sticking prevention, diffusion or anti glare may be performed onto the face on which the polarizing film of the above described transparent protective film has not been adhered. A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 μm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight part to the transparent resin 100 weight part that forms the fine concavo-convex structure on the surface, and preferably 5 to 25 weight part. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective layer.

As pressure sensitive adhesive that forms adhesive layer (a) is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Proper method may be carried out to attach an adhesive layer to one side or both sides of the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as flow method and coating method, or a method in which an adhesive layer is once formed on a separator, as mentioned above, and is then transferred on a polarizing plate or an optical film may be mentioned.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows optical diffusion nature.

Thickness of an adhesive layer may be suitably determined depending on a purpose of usage or adhesive strength, etc., and generally is 1 to 500 μm, preferably 5 to 200 μm, and more preferably 10 to 100 μm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

The elliptically polarizing plate of the present invention may suitably be used in image displays. For example, it may be preferably used for formation of various apparatus, such as liquid crystal displays of reflective semi-transmission type. Reflective semi-transmission type liquid crystal displays etc. may be suitably used as portable information and telecommunications instruments and personal computers. When forming a reflected type semi-transmission type liquid crystal display, an elliptically polarizing plate of this invention is arranged on a backlight (BL) of a liquid crystal cell.

Figure 9:
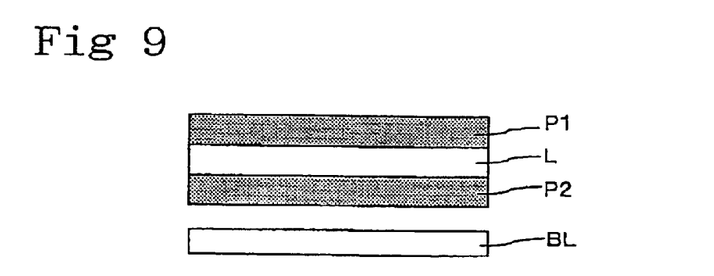
FIG. 9 shows a sectional view of an example of a reflective semi-transmission type liquid crystal display of Example.

In FIG. 9, an elliptically polarizing plate (P1) of the present invention shown in FIG. 5 or 7 is arranged via a pressure sensitive adhesive layer, on a side of a backlight (BL) of a liquid crystal cell (L) in a reflective semi-transmission type liquid crystal display. Although an arranged side of an elliptically polarizing plate (P1) being laminated on a lower side (backlight side) of liquid crystal cell (L) is not especially limited, it is preferably arranged so that a polarizing plate (P) of the elliptically polarizing plate (P1) may be most separated from the liquid crystal cell (L) side. Liquid crystal is enclosed within a liquid crystal cell (L). A transparent electrode is provided on an upper liquid crystal cell substrate, and a reflecting layer serving also as an electrode is provided on a lower liquid crystal cell substrate. An elliptically polarizing plate (P2) and various optical films that are used for reflective semi-transmission type liquid crystal displays are arranged on an upper side of liquid crystal cell substrate. The elliptically polarizing plate (P2) may also preferably arrange so that the polarizing plate (P) may be most separated from the liquid crystal cell (L) side.

Besides, when the laminated optical film and the elliptically polarizing plate of the present invention are mounted in a liquid crystal display etc., in the optical film (2), an average optical axis (an average angle of tilted alignment) of a material showing optically negative uniaxial property is preferably arranged so it may face an almost same direction as a direction of alignment of a liquid crystal molecule in a thick direction middle (mid-plane) of a liquid crystal cell, which is aligned by voltage applied from upper side and lower side. In aforesaid case, an alignment of the liquid cell may be twisted type or non-twisted type.

The reflective semi-transmission type liquid crystal display of the FIG. 9 is shown as an example of liquid crystal cells, and, in addition to the example, a laminated optical film and an elliptically polarizing plate of the present invention may be used in various kinds of liquid crystal displays.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy (D-BEF and others manufactured by 3M Co., Ltd.); an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported (PCF350 manufactured by Nitto Denko CORPORATION, Transmax manufactured by Merck Co., Ltd., and others); etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light band, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light band, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Assembling of a liquid crystal display may be carried out according to conventional methods. That is, a liquid crystal display is generally manufactured by suitably assembling several parts such as a liquid crystal cell, optical films and, if necessary, lighting system, and by incorporating driving circuit. In the present invention, except that an elliptically polarizing plate by the present invention is used, there is especially no limitation to use any conventional methods. Also any liquid crystal cell of arbitrary type, such as TN type, and STN type, $\pi$ type may be used.

Suitable liquid crystal displays, such as liquid crystal display with which the above-mentioned elliptically polarizing plate has been located at one side or both sides of the liquid crystal cell, and with which a backlight or a reflector is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, an organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg-Ag and Al-Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarizing plate, while preparing the polarizing plate on the surface side of the transparent electrode. Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to $\pi/4$, the mirror surface of the metal electrode may be completely covered. This means that only linearly polarized light component of the external light that enters as incident light into this organic EL display is transmitted with the work of polarizing plate. This linearly polarized light generally gives an elliptically polarized light by the retardation plate, and specially the retardation plate is a quarter wavelength plate, and moreover when the angle between the two polarization directions of the polarizing plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

The present invention will, hereinafter, be described in detail in reference to Examples; this invention is not limited to them at all. Part represents part by weight in each Example.

In measurement of a refractive index and a retardation of each optical film, principal refractive indexes nx, ny, and nz inside of a film plane and in a thickness direction were measured for those characteristics in $\lambda=590$ nm, using an automatic birefringence measuring apparatus (manufactured by Oji Scientific Instruments, automatic birefringence meter KOBRA21 ADH).

In the optical film (2), an tilting angle that was mad by an average optical axis of an optical material having tilted alignment and a direction of normal line of the optical film (2) were inclined −50 degrees to 50 degrees to right and left centering on slow axis in the optical film (2), and thus a retardation was measured with the measuring apparatus. An absolute value of an angle showing a minimum retardation was adopted. Besides, in measurement, a measured angle was set as 0 degree, when a normal line to a film plane is in agreement with a direction of incidence of a light from a light source of a measuring instrument.

Example 1
(Optical Film (1) having a Controlled Three Dimensional Refractive Index)

Thermally shrinkable films comprising biaxial stretching polyester film were attached on both sides of a transparent polycarbonate film having a thickness of 70 micrometers via pressure sensitive adhesive layers. Subsequently, obtained film was held in a simultaneous biaxial stretching machine, and was stretched 1.1 times at 155 degrees C. An obtained stretched film had a thickness 72 micrometers, a front retardation: 140 nm and a thickness direction retardation: 70 nm, and an Nz coefficient: 0.5.
(Optical Film (2) in which a Material Showing Optically Negative Uniaxial Property is Tilting Aligned)

WVSA12B manufactured by FUJI PHOTO FILM CO., LTD. (thickness: 110 micrometers) was used. The film concerned was manufactured by coating a discotic liquid crystal to a supporting medium, and had a front retardation: 30 nm, a thickness direction retardation: 160 nm, and tilting angle of an average optical axis being tilting aligned: 20 degrees.

(Optical Film (3) Showing Optically Positive Uniaxial Property)

A norbornene-based film having a thickness of 100 micrometers (manufactured by JSR, Inc., product name Arton) was uniaxially stretched 1.5 times at 170 degrees C. Obtained stretched film had a thickness: 75 micrometers, a front retardation: 270 nm, and a thickness direction retardation: 270 nm.

(Laminated Optical Film and Elliptically Polarizing Plate)

The optical film (1) and the optical film (2) were laminated via a pressure sensitive adhesive layer (acrylic based pressure sensitive adhesive: thickness 30 micrometers) to obtain a laminated optical film (FIG. 1). Subsequently, the optical film (3) was laminated on a side of the optical film (1) of the laminated optical film via a pressure sensitive adhesive layer (acrylic based pressure sensitive adhesive: thickness 30 micrometers) to obtain a laminated optical film (FIG. 2). Furthermore, a polarizing plate (P: manufactured by NITTO DENKO CORP., TEG1465DU) was laminated on a side of the optical film (3) of the laminated optical film, via a pressure sensitive adhesive layer (acrylic based pressure sensitive adhesive: thickness 30 micrometers) to obtain an elliptically polarizing plate (FIG. 5).

Example 2

(Optical Film (1) having a Controlled Three Dimensional Refractive Index)

Thermal shrinkable films comprising biaxially stretched polyester film were attached on both sides of a transparent polycarbonate film having a thickness of 70 micrometers via pressure sensitive adhesive layers. Subsequently, obtained film was held in a simultaneous biaxial stretching machine, and was stretched 1.05 times at 165 degrees C. Obtained stretched film had a thickness: 75 micrometers, a front retardation: 140 nm, a thickness direction retardation: 0 nm, and an Nz coefficient: 0.

(Laminated Optical Film and Elliptically Polarizing Plate)

Except for having used a stretched film manufactured above as an optical film (1) in Example 1, a same method as in Example 1 was repeated to obtain a laminated optical film and an elliptically polarizing plate.

Example 3

The optical film (1), the optical film (2), the optical film (3), and the polarizing plate (P) that were used in Example 1 were laminated in an order of optical film (1)/optical film (2)/optical film (3)/polarizing plate (P) via pressure sensitive adhesive layers (acrylic based pressure sensitive adhesive: thickness 30 micrometers) to obtain elliptically polarizing plate (FIG. 6).

Example 4

The optical film (1), the optical film (2), the optical film (3), and the polarizing plate (P) that were used in Example 1 were laminated in an order of optical film (1)/optical film (3)/optical film (2)/polarizing plate (P), via pressure sensitive adhesive layers (acrylic based pressure sensitive adhesive: thickness 30 micrometers) to obtain an elliptically polarizing plate (FIG. 7).

Comparative Example 1

(Retardation Film)

A transparent polycarbonate film having a thickness of 70 micrometers was uniaxially stretched 1.15 times at 155 degrees C., using a uniaxial stretching machine. Obtained stretched film had a thickness: 60 micrometers, a front retardation: 140 nm, a thickness direction retardation: 140 nm, and an Nz coefficient: 1.

(Laminated Optical Film and Elliptically Polarizing Plate)

Except for having used a retardation film (stretched film) manufactured above instead of the optical film (1) in Example 1, a same method as in Example 1 was repeated to obtain a laminated optical film and an elliptically polarizing plate.

Referential Example 1

(Optical Film (3) Showing Optically Positive Uniaxial Property)

A norbornene-based film (manufactured by JSR, Inc., product name Arton) having a thickness of 100 micrometers was uniaxially stretched 1.3 times at 170 degrees C. Obtained stretched film had a thickness: 80 micrometers, a front retardation: 140 nm, and a thickness direction retardation: 140 nm.

This was named as optical film (3-2).

(Elliptically Polarizing Plate)

Figure 8:
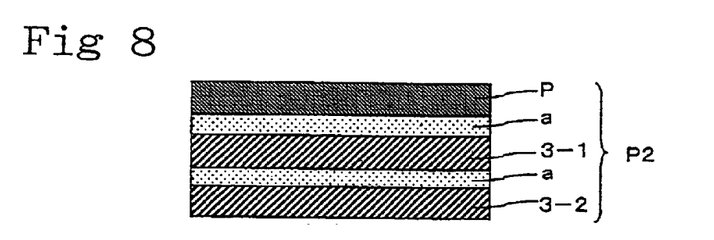
FIG. 8 shows one embodiment of a sectional view of an elliptically polarizing plate of Referential Example.

The optical film (3) showing optically positive uniaxial property obtained in Example 1 was used as an optical film (3-1). As shown in FIG. 8, the optical film (3-1) and the optical film (3-2) concerned were laminated to a polarizing plate (P: manufactured by NITTO DENKO CORP., TEG1465DU) via a pressure sensitive adhesive layer (acrylic based pressure sensitive adhesive: thickness 30 micrometers) to obtain an elliptically polarizing plate.

(Evaluation)

The elliptically polarizing plate manufactured in Examples and Comparative example was mounted as elliptically polarizing plates (P1) on a side of a backlight of a reflective semi-transmission type TFT-TN type liquid crystal display in FIG. 9. On the other hand, the elliptically polarizing plate manufactured in Referential Example 1 was mounted as an elliptically polarizing plate (P2) on a viewing side. Both of the elliptically polarizing plates (P1) and the elliptically polarizing plates (P2) were mounted so that a polarizing plate side might be arranged in a lamination position most separated from a liquid crystal cell (L) side.

Subsequently, Y value, x value, and y value in XYZ colorimetric system in front and vertical and horizontal, and 0 to 70 degrees in viewing angles were measured, using an EZcontrast160D made by ELDIM SA. in a state where white picture and black picture were being displayed on the above-mentioned liquid crystal displays.

An angle giving 10 of value of contrast or more at that time (Y value (white picture)/Y value (black picture)) was defined as a viewing angle. Table 1 shows the results.

Moreover, a chromaticity variation of chromaticity ($x_{40}$, $y_{40}$) in a state of being vertically and horizontally tilted 40 degrees to a chromaticity ($x_0$, $y_0$) in front of a screen, respectively, was measured and evaluated about white picture. A chromaticity variation was calculated by a following equation. Table 1 shows the results.

Chromaticity variation=$\sqrt{\{(x_{40}-x_0)^2+(y_{40}-y_0)^2\}}$

TABLE 1

|  | Example 1 | | Example 2 | | Example 3 | | Example 4 | | Comparative example 1 | |
| --- | --- | --- | --- | --- | --- | --- | --- | --- | --- | --- |
|  | Viewing angle (degree) | Chromaticity variation (–) | Viewing angle (degree) | Chromaticity variation (–) | Viewing angle (degree) | Chromaticity variation (–) | Viewing angle (degree) | Chromaticity variation (–) | Viewing angle (degree) | Chromaticity variation (–) |
| Viewed in inclined direction (Upper direction) | 25 | 0.30 | 28 | 0.28 | 20 | 0.32 | 17 | 0.33 | 13 | 0.35 |
| Viewed in inclined direction (Lower direction) | 27 | 0.28 | 30 | 0.28 | 20 | 0.31 | 18 | 0.33 | 15 | 0.33 |
| Viewed in inclined direction (Left direction) | 25 | 0.27 | 27 | 0.27 | 22 | 0.29 | 22 | 0.29 | 14 | 0.30 |
| Viewed in inclined direction (Right direction) | 25 | 0.27 | 27 | 0.27 | 23 | 0.20 | 22 | 0.29 | 14 | 0.30 |

What is claimed is:

1. A laminated optical film comprising:

an optical film (1) whose three dimensional refractive index is controlled so that an Nz coefficient represented with $Nz=(nx_1-nz_1)/(nx_1-ny_1)$ satisfies a relationship of $Nz \leq 0.9$, when a direction where a refractive index in a film plane gives maximum is defined as X-axis, a direction perpendicular to X-axis as Y-axis, a thickness direction of the film as Z-axis, and refractive indexes in each axial direction are defined as $nx_1$, $ny_1$, and $nz_1$, respectively, an optical film (2) that is formed with a material showing optically negative uniaxial property, and being tilting aligned, and an optical film (3) that satisfies $nx_3 > ny_3 \approx nz_3$ and demonstrates optically positive uniaxial property, when a direction where a refractive index in a film plane gives maximum is defined as X-axis, a direction perpendicular to X-axis as Y-axis, a thickness direction of the film as Z-axis, and refractive indexes in each axial direction are defined as $nx_3$, $ny_3$, and $nz_3$, respectively.

2. The laminated optical film according to claim 1, wherein the Nz coefficient of the optical film (1) having the controlled three dimensional refractive index satisfies a relationship of $Nz \leq 0.3$.

3. The laminated optical film according to claim 1, wherein the material showing optically negative uniaxial property forming the optical film (2) is a discotic liquid crystal compound.

4. The laminated optical film according to claim 1, wherein the material showing optically negative uniaxial property forming the optical film (2) is tilting aligned so that an average optical axis, and a direction of normal line of the optical film (2) give a tilting angle in a range of 5 degrees to 50 degrees.

5. The laminated optical film according to claim 1, wherein the optical film (1) having the controlled three dimensional refractive index is arranged between the optical film (3) showing optically positive uniaxial property and the optical film (2) in which a material showing optically negative uniaxial property is tilting aligned.

6. An elliptically polarizing plate comprising:

the laminated optical film according to claim 1 and a polarizing plate.

7. The elliptically polarizing plate according to claim 6, wherein the polarizing plate is laminated on a side of the optical film (3) of the laminated optical film.

8. An image display comprising the laminated optical film according to claim 1.

9. An image display comprising the elliptically polarizing plate according to claim 6.

10. The image display of claim 9, wherein the laminated optical film is disposed on one side of a liquid crystal cell.

11. The image display of claim 10, wherein the laminated optical film is mounted on a backlight side of the liquid crystal cell.

12. The laminated optical film according to claim 5, wherein the Nz coefficient of the optical film (1) having the controlled three dimensional refractive index satisfies a relationship of $Nz \leq 0.3$.

13. The laminated optical film according to claim 5, wherein the material showing optically negative uniaxial property forming the optical film (2) is a discotic liquid crystal compound.

14. The laminated optical film according to claim 5, wherein the material showing optically negative uniaxial property forming the optical film (2) is tilting aligned so that an average optical axis, and a direction of normal line of the optical film (2) give a tilting angle in a range of 5 degrees to 50 degrees.

15. An elliptically polarizing plate comprising:

the laminated optical film according to claim 5 and a polarizing plate.

16. The elliptically polarizing plate according to claim 15, wherein the polarizing plate is laminated on a side of the optical film (3) of the laminated optical film.

17. An image display comprising the laminated optical film according to claim 5.

18. An image display comprising the elliptically polarizing plate according to claim 15.

19. The image display of claim 18, wherein the laminated optical film is disposed on one side of a liquid crystal cell.

20. The image display of claim 19, wherein the laminated optical film is mounted on a backlight side of the liquid crystal cell.

* * * * *